United States Patent
Johnson et al.

(10) Patent No.: US 8,711,705 B1
(45) Date of Patent: Apr. 29, 2014

(54) METHOD AND SYSTEM FOR MONITORING SERVICE QUALITY IN A MOBILE NODE

(75) Inventors: Harold W. Johnson, Roach, MO (US); Timothy D. Euler, Leawood, KS (US)

(73) Assignee: Sprint Spectrum L.P., Overland Park, KS (US)

(*) Notice: Subject to any disclaimer, the term of this patent is extended or adjusted under 35 U.S.C. 154(b) by 1587 days.

(21) Appl. No.: 11/852,532

(22) Filed: Sep. 10, 2007

(51) Int. Cl.
- *H04L 12/26* (2006.01)
- *H04L 12/28* (2006.01)
- *H04B 17/00* (2006.01)
- *H04M 1/24* (2006.01)

(52) U.S. Cl.
USPC ............... 370/241; 455/67.11; 379/1.01

(58) Field of Classification Search
USPC .......... 370/241, 242, 310, 332, 333; 455/67.11, 115.1, 226.1, 422.1, 423, 455/456.1; 379/1.01, 1.02, 1.03, 1.04, 379/32.01
See application file for complete search history.

(56) References Cited

U.S. PATENT DOCUMENTS

| | | | |
|---|---|---|---|
| 5,425,076 A | 6/1995 | Knippelmier | |
| 5,465,399 A * | 11/1995 | Oberholtzer et al. | 455/69 |
| 5,987,306 A | 11/1999 | Nilsen et al. | |
| 6,754,470 B2 | 6/2004 | Hendrickson et al. | |
| 6,842,613 B2 * | 1/2005 | Mittal | 455/419 |
| 7,039,417 B2 * | 5/2006 | Lyle et al. | 455/452.2 |
| 7,206,573 B1 | 4/2007 | Weaver et al. | |
| 7,474,627 B2 * | 1/2009 | Chheda et al. | 370/252 |
| 7,475,140 B2 * | 1/2009 | Requena | 709/225 |
| 7,792,043 B2 * | 9/2010 | McNutt et al. | 370/242 |
| 7,925,740 B2 * | 4/2011 | Nath et al. | 709/224 |
| 8,055,201 B1 * | 11/2011 | Kuan | 455/67.11 |
| 8,208,939 B2 * | 6/2012 | Aljadeff et al. | 455/456.1 |
| 8,295,826 B2 * | 10/2012 | Bizzarri et al. | 455/425 |
| 2002/0069037 A1 | 6/2002 | Hendrickson et al. | |
| 2002/0127993 A1 | 9/2002 | Zappala | |
| 2004/0058652 A1 | 3/2004 | McGregor et al. | |
| 2005/0114504 A1 | 5/2005 | Marolia et al. | |
| 2006/0148410 A1 * | 7/2006 | Nelson et al. | 455/67.11 |
| 2007/0026854 A1 * | 2/2007 | Nath et al. | 455/423 |
| 2007/0111748 A1 * | 5/2007 | Risbood | 455/550.1 |
| 2007/0218888 A1 * | 9/2007 | De Froment | 455/422.1 |
| 2007/0286347 A1 * | 12/2007 | Moore | 379/1.01 |
| 2008/0069002 A1 * | 3/2008 | Savoor et al. | 370/241 |
| 2008/0108348 A1 * | 5/2008 | Kottilingal et al. | 455/435.1 |
| 2009/0052330 A1 * | 2/2009 | Matsunaga et al. | 370/242 |
| 2009/0117851 A1 * | 5/2009 | Malaney | 455/67.11 |

OTHER PUBLICATIONS

International Engineering Consortium, "Element Management Systems (EMSs)," Web ProForum Tutorials, 2002.

* cited by examiner

*Primary Examiner* — X. Wong

(57) ABSTRACT

A mobile node includes a software client that is configured to monitor the quality of a communication service provided by a wireless network and to detect an impairment of the communication service. When a service impairment is detected, the software client is further configured to generate a service impairment report for transmission to a service quality management system for the wireless network. The service impairment report may include a description of the service impairment (such as the category of impairment), a time associated with the impairment, and a location associated with the impairment. The software client may also be configured to determine a cause of the detected impairment and to indicate the cause in the service impairment report.

20 Claims, 4 Drawing Sheets

METHOD AND SYSTEM FOR MONITORING SERVICE QUALITY IN A MOBILE NODE

BACKGROUND

1. Field of the Invention

The present invention relates to telecommunications and, more particularly, to methods and systems for monitoring service quality in mobile nodes.

2. Description of Related Art

As wireless telecommunications networks have become increasingly complex, it has become increasingly important for wireless service providers to employ an appropriate operations support system (OSS) for managing their networks. The tasks performed by the OSS typically include fault management, configuration management, accounting management, performance management, and security management (which are often referred to as "FCAPS" functions). The typical OSS architecture is layered. At the lowest level, various element management systems (EMSs) manage network elements such as switches and base stations. The EMSs, in turn, communicate with higher-level network management systems (NMSs).

One purpose of OSS functions such as fault management and performance management is maintenance of an acceptable quality of service for subscribers. The EMSs play a role in maintaining service quality by detecting faults and by collecting performance data and resource utilization data for the network elements that they monitor. When an EMS detects a fault or a performance degradation, the EMS may report this to the NMS to allow for troubleshooting and repair.

SUMMARY

In a first principal aspect, an exemplary embodiment provides a method for monitoring service quality in a mobile node. In accordance with the method, the mobile node attempts to use a communication service of a wireless network. The mobile node detects an impairment of the communication service. The mobile node selects a category of the impairment from among a plurality of predefined categories. The mobile node determines a cause of the impairment. The mobile node sends a service impairment report to a service quality management system. The service impairment report indicates (i) the category of the impairment, (ii) the cause of the impairment, (iii) a time associated with the impairment, and (iv) a location associated with the impairment.

In a second principal aspect, an exemplary embodiment provides a method for monitoring service quality in a mobile node. In accordance with the method, the mobile node engages in a packet-based communication session via a wireless network. While engaged in the packet-based communication session, the mobile node monitors a user-perspective performance metric of the packet-based communication session. The mobile node determines that the user-perspective performance metric indicates a service impairment. The mobile node sends a service impairment report to a service quality management system via the wireless network. The service impairment report includes a description of the service impairment, a time associated with the service impairment, and a location associated with the service impairment.

In a third exemplary embodiment, a mobile node comprises a radio frequency (RF) transceiver for communicating with a wireless network via an air interface; a processor; and data storage. Service logic is stored in the data storage and is executable by the processor for using a communication service of the wireless network. Detection logic is stored in the data storage and is executable by the processor for detecting an impairment of the communication service. Description logic is stored in the data storage and is executable by the processor for generating a description of the impairment. Reporting logic is stored in the data storage and is executable by the processor for generating a service impairment report for transmission to a service quality management system via the wireless network. The service impairment report includes (i) the description of the impairment, (ii) a time associated with the impairment, and (iii) a location associated with the impairment.

DETAILED DESCRIPTION OF EXEMPLARY EMBODIMENTS

1. Overview

The inventors have recognized that conventional OSS approaches do not provide adequate monitoring of the service quality experienced by a mobile node user because the monitoring of network elements such as switches and base stations that is conventionally done by EMSs provides only an indirect view of the user's experience.

To address this shortcoming of conventional OSS approaches, the inventors propose providing a mobile node with functionality, such as a software client, that enables the mobile node to detect impairments in communication services provided by the wireless network and to report such service impairments to a service quality management system for the wireless network. Thus, the mobile node may detect and report service impairments such as blocked calls and dropped calls. The mobile node may also proactively measure performance metrics during communication sessions and then detect and report a service impairment when a performance metric fails to satisfy specified acceptability criteria.

The service impairment report that a mobile node sends to the service quality management system may include a description of the service impairment, a time associated with the service impairment, and a location associated with the service impairment. The location where a service impairment occurs can provide important information for purposes of troubleshooting and correcting the problem. Thus, when a mobile node detects a service impairment, the mobile node may use a satellite-based positioned system or other wireless positioning technology to determine its current location and then include that location in the service impairment report.

When a mobile node detects a service impairment, the mobile node may also try to determine the cause of the service impairment. For example, in the case of a call origination failure, the mobile node may check the signal level of one or more signals transmitted by the wireless network to determine whether inadequate wireless coverage is the cause of the failure. When the mobile node determines the cause of the service impairment, the mobile node may indicate the cause in the service impairment report sent to the service quality management system In this way, OSS functions may be extended to the mobile nodes themselves in order to more directly monitor the service quality experienced by users.

2. Network Architecture

Figure 1:
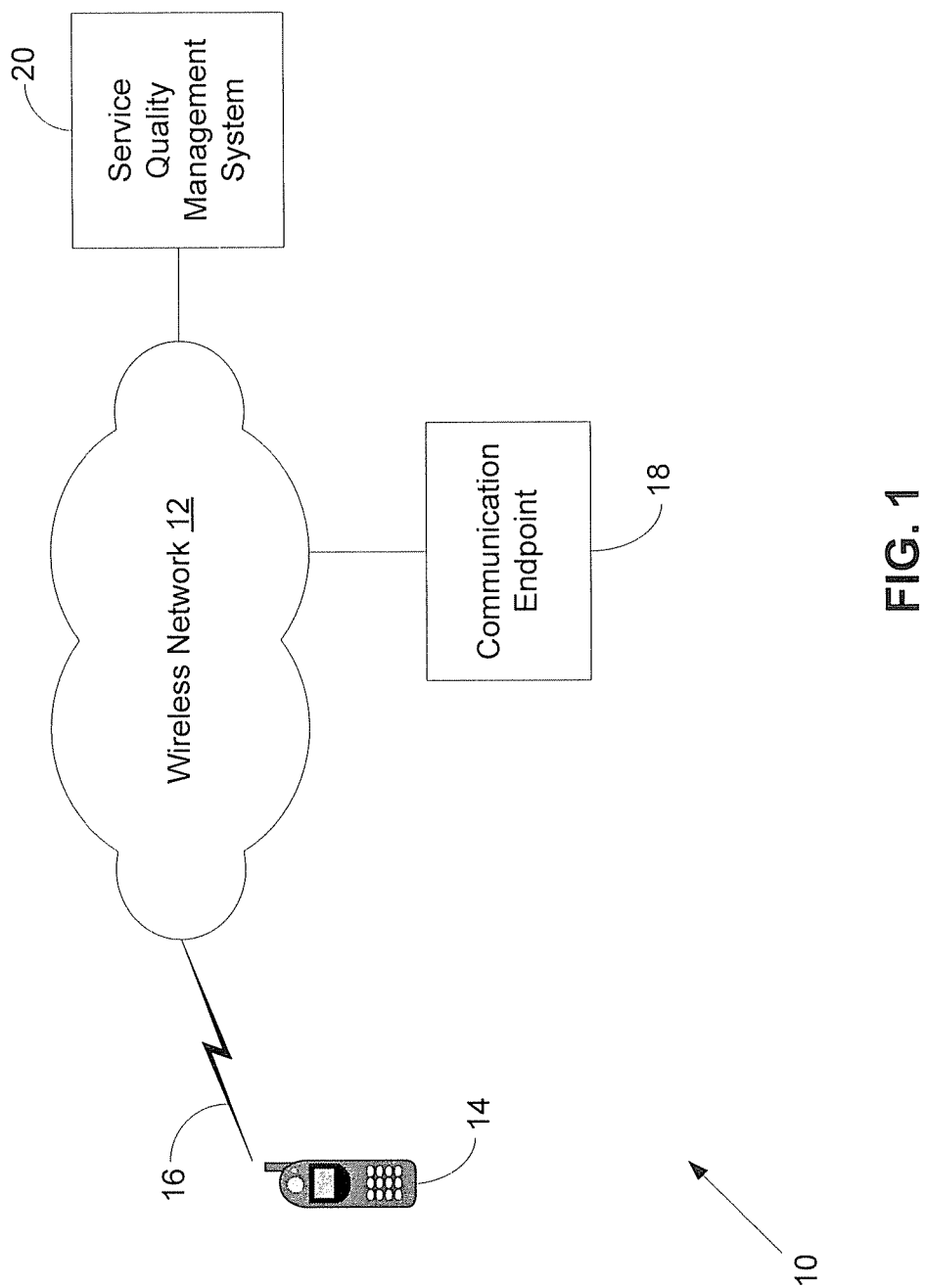
FIG. 1 is a simplified block diagram of a telecommunications system, in accordance with an exemplary embodiment.

FIG. 1 is a simplified block diagram of an exemplary telecommunications system 10 in which exemplary embodiments may be employed. Telecommunications system 10 includes a wireless network 12 that can communicate with mobile nodes, such as mobile node 14, via an air interface 16. Wireless network 12 could be, for example, a wireless wide area network (WWAN), a wireless metropolitan area network (WMAN), or a wireless local area network (WLAN). Wireless network 12 may include circuit-switched communication links and/or packet-switched communication links between network elements.

Mobile node 14 could be a wireless telephone, a wireless personal digital assistant (PDA), wirelessly-equipped personal computer, or other type of wireless communication device. Mobile node 14 may use a communication service of wireless network 12 to communicate with one or more endpoints, exemplified in FIG. 1 by communication endpoint 18. For example, mobile node 14 may establish a communication session with communication endpoint 18 via wireless network 12. The communication session could be a voice call, e.g., if communication endpoint 18 is a voice communication device such as a wireless telephone or landline telephone. Alternatively, the communication session could be a data call, e.g., if communication endpoint 18 is a Web server, e-mail serer, gaming server, media server, or other type of data server. It is to be understood that such voice calls and data calls could be either circuit-based or packet-based.

During these communication sessions, mobile node 14 and wireless network 12 may exchange voice or data via air interface 16. The communications over air interface 16 may conform to a format such as 1xRTT, EV-DO, GSM, GPRS, 802.11 (WiFi), or 802.16 (WiMAX). However, other air interface formats could be used.

Mobile node 14 may also be able to access a service quality management system 20 via wireless network 12. Service quality management system 20 may be part of an operations support system (OSS) for wireless network 12. For example, service quality management system 20 may monitor the performance of one or more elements of wireless network 12 and may initiate corrective action if fault conditions or performance problems are identified. As described in more detail below, mobile node 14 may extend the reach of the monitoring functions provided by service quality management system 20 by performing its own monitoring of service quality and reporting any service impairments to service quality management system 20.

3. Exemplary Methods for Monitoring Service Quality

Figure 2:
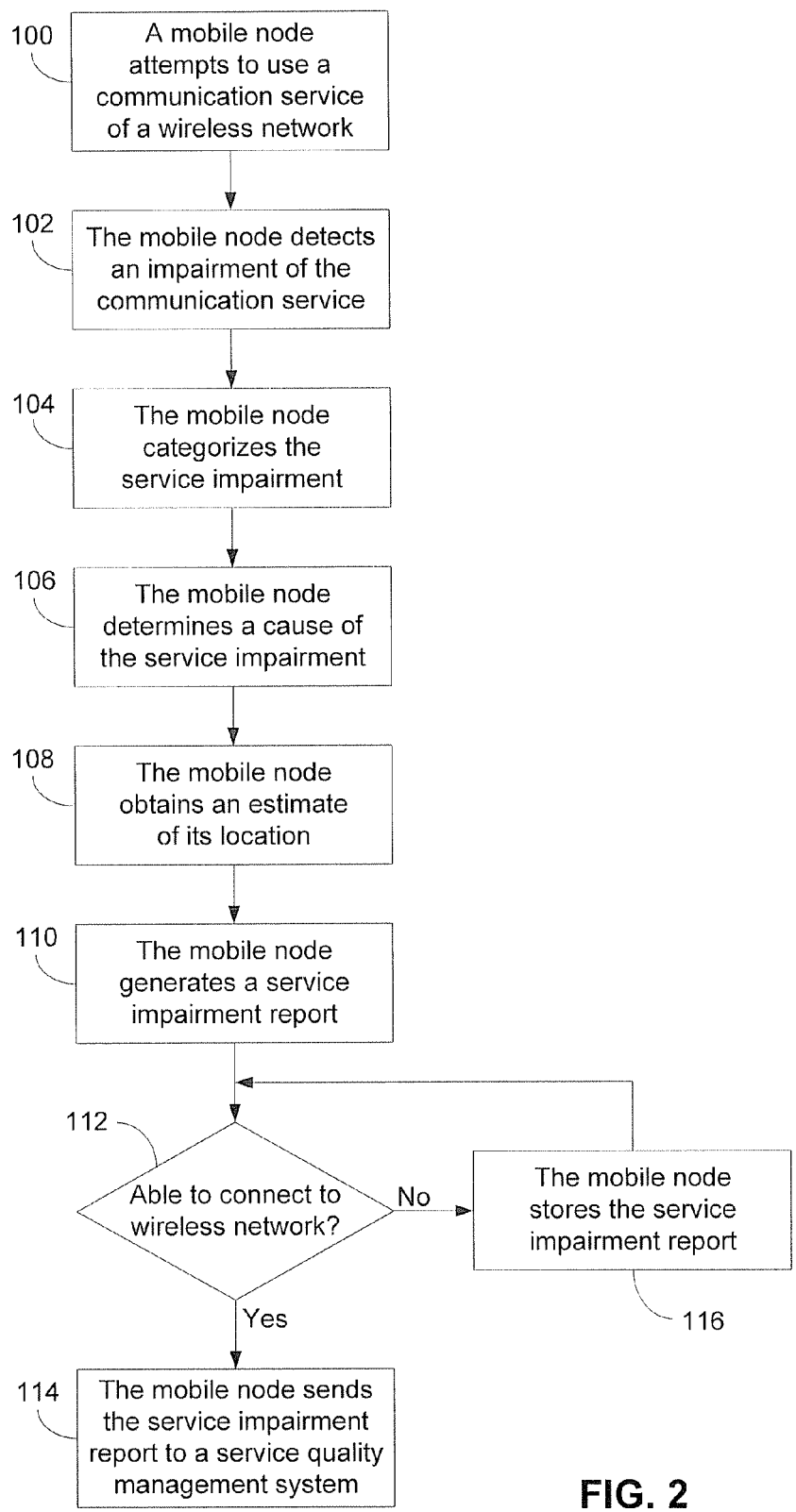
FIG. 2 is a flow chart illustrating a method for monitoring service quality, in accordance with an exemplary embodiment.

FIG. 2 is a flow chart illustrating an exemplary method for monitoring service quality. The process may begin when a mobile node (e.g., mobile node 14) attempts to use a communication service of a wireless network (e.g., wireless network 12), as indicated by block 100. For example, the mobile node may attempt to originate a voice call (either a circuit-switched voice call or a voice-over-packet call), to originate a data call (e.g., for Web browsing, e-mail, gaming, or receiving streaming video or audio), or to send a text or multi-media message.

However, the mobile node may detect an impairment of the communication service, as indicated by block 102. The mobile node may detect the service impairment at different stages of attempting to use the communication service. In particular, a service impairment may occur when the mobile node is unsuccessful in its attempt to use the communication service. For example, the mobile node may experience a call origination failure. Alternatively, a service impairment may occur when the mobile node is able to originate a call but is not able to complete the desired communication. For example, a call may be dropped prematurely or the mobile node may encounter an error or poor performance during the call.

When the mobile node detects a service impairment, the mobile node may categorize the service impairment, as indicated by block 104. For example, the mobile node may select a category of service impairment from a plurality of predefined categories. Thus, if the mobile node is unable to originate a call, the mobile node may categorize the service impairment as a "call origination failure." If the mobile node is able to originate a call but the call is dropped prematurely, the mobile node may categorize the service impairment as a "dropped call." It is to be understood that the categories of "call origination failure" and "dropped call" are exemplary only, as other categories of service impairment could be defined. For example, in the case of packet-based communications, the mobile node may detect other types of service impairment, as described below with reference to FIG. 3.

How the mobile node responds to the service impairment may depend on the category of service impairment. For example, when a call origination failure or a dropped call is detected, the mobile node may determine a cause of the service impairment, as indicated by block 106. To determine the cause of a call origination failure or dropped call, the mobile node may determine a signal level of a radio frequency (RF) signal transmitted by the wireless network. For example, the mobile node may measure a signal carrier-to-noise ratio (C/N) of a pilot signal transmitted by a base station in the wireless network. If C/N is low (e.g., below a predetermined threshold level), then the mobile node may identify the cause of the service impairment as inadequate RF coverage. If C/N is high (e.g., above the predetermined threshold level), then the mobile node may identify the cause of the service impairment as inadequate capacity.

The mobile node may also obtain an estimate of its location, as indicated by block 108. The mobile node may obtain an estimate of its location either by retrieving a stored location fix that was obtained before detecting the service impairment (e.g., a location fix that was established within a predetermined time before the service impairment) or by initiating a location determination session after detecting the service impairment. The location estimate could be obtained, for example, by using the Global Positioning System (GPS), advanced forward link trilateration (AFLT), or hybrid methods.

The mobile node may then generate a service impairment report, as indicated by block 110. The service impairment report may include, for example, a description of the service impairment (e.g., an indication of the category of service impairment determined in block 104), an indication of the cause of the service impairment (e.g., the cause determined in block 106), a time associated with the service impairment (e.g., the time that the mobile node detected the service impairment), and a location associated with the service impairment (e.g., the location estimate obtained in block 108).

Whether the mobile node is able to send the service impairment report right away depends on whether the mobile node is able to connect to the wireless network, as indicated by block 112. If the mobile node is able to connect to the wireless network, then the mobile node sends the service impairment report to a service quality management system (e.g., service quality management system 20) via the wireless network, as indicated by block 114.

If the mobile node is not able to connect to the wireless network (which is likely given the service impairment that the mobile node just detected), then the mobile node may store the service impairment report for later transmission, as indicated by block 116. After waiting for a period of time, the mobile node may again try to connect to the wireless network so as to be able to send the service impairment report to the service quality management system. For example, if inadequate RF coverage caused the service impairment, then the mobile node may need to move into an area of good RF coverage in order to be able to send the service impairment report. On the other hand, if inadequate capacity caused the service impairment, then the mobile node may need to wait until capacity becomes available in order to send the service impairment report.

When the service quality management system receives the service impairment report, the service quality management system may take a number of different actions. For example, if the service impairment report indicates (e.g., in combination with similar service impairment reports) a widespread problem, then the service quality management system may take corrective action in real time. For example, if a mobile node's service impairment report indicates a capacity problem, then the service quality management system may be able to adjust the operational parameters of the wireless network so as to increase capacity in the mobile node's location.

The service quality management system may also store the information from multiple service impairment reports so as to build up service impairment statistics that can be used to identify RF coverage holes or capacity bottlenecks in the wireless network. For example, the locations reported in service impairment reports that indicate inadequate RF coverage as the cause of service impairments can be identified and addressed (e.g., by increasing transmit power levels or by providing additional antenna coverage for those locations). Similarly, the locations reported in service impairment reports that indicate inadequate capacity as the cause of service impairments can be identified and addressed (e.g., by providing additional bandwidth in for those locations).

Separate and apart from any corrective action that may be taken, the service quality management system may also communicate with the mobile node's user regarding the service impairment reported by the mobile node. For example, the service quality management system may send a notification to the user that acknowledges the service impairment. The notification could also indicate that the service impairment has been recognized by operations personnel and that corrective action will be taken to improve service. The notification could be a real-time or near real-time communication, such as a text message to the user's mobile node, an e-mail message to an e-mail account associated with the user, or a voicemail message.

As noted above, call origination failures and dropped calls are merely examples of service impairments that a mobile node may be able to detect and report. In particular, a mobile node may report service impairments that represent a degradation of the quality of a communication service, in addition to a complete inability to use a communication service. For example, a mobile node may continually monitor one or more performance metrics while the mobile node uses a communication service, and the mobile node may report as a service impairment any instance of a performance metric that fails to meet predefined acceptability criteria. Such performance metrics monitored by the mobile node could be user-perspective performance metrics, i.e., factors that can affect the user's experience in using the communication service. Such factors could include, for example, voice quality, latency, and data rate.

Figure 3:
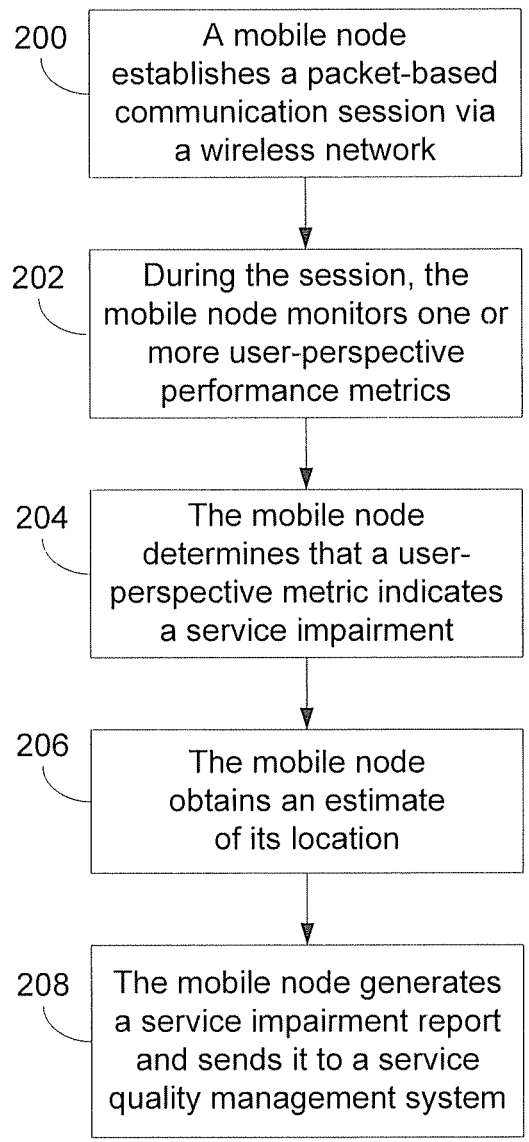
FIG. 3 is a flow chart illustrating a method for monitoring service quality, in accordance with an exemplary embodiment.

FIG. 3 is a flow chart illustrating an exemplary method for monitoring service quality in a packet-based communication session. The process may begin when a mobile establishes a packet-based communication session via a wireless network, as indicated by block 200. For example, mobile node 14 may establish a packet-based communication session with communication endpoint 18 via wireless network 12. The packet-based communication session could be a voice session, such as a voice-over-Internet-Protocol (VoIP) session. Alternatively, the packet-based communication session could be a data session, such as Web browsing or receiving streaming audio and/or video.

During the session, the mobile node may monitor one or more user-perspective performance metrics, as indicated by block 202. The mobile node may monitor different user-perspective performance metrics for different types of communication sessions. For example, if mobile node 14 is engaged in a VoIP session with communication endpoint 18, mobile node 14 may monitor voice quality by periodically sending a "ping" signal to communication endpoint 18 and measuring the round-trip delay time. If the communication session is one in which the mobile node is receiving streaming media, then the mobile node may monitor the data rate as a user-perspective performance metric.

At some point, the mobile node may determine that a user-perspective metric indicates a service impairment, as indicated by block 204. This may occur when the mobile node determines that a user-perspective performance metric that the mobile node has been monitoring fails to meet a predefined acceptability criterion. For example, an acceptability criterion may require the data rate in the session to stay above a predetermined threshold value in order for the service quality to be deemed acceptable. If the data rate falls below this value, then a service impairment is indicated. For a VoIP session, an acceptability criterion may require the end-to-one one way delay time (e.g., measured using a "ping" signal as described above) to be less than a predetermined threshold value in order for voice quality to be acceptable. If the delay time is greater than this value (the value could be, for example, 285 milliseconds), then a service impairment is indicated. It is to be understood that these acceptability criteria are exemplary only, as other criteria could be used.

When the mobile node detects such a service impairment, the mobile node obtains an estimate of its location, as indicated by block 206. The location estimate could be a GPS location estimate. However, other technologies could be used for estimating the mobile node's location.

The mobile node may then generate a service impairment report and send the report to a service quality management system, as indicated by block 208. The service impairment report may include a description of the service impairment, a time associated with the service impairment (e.g., the time at which the mobile node detected the impairment), and a location associated with the service impairment (e.g., the location estimate obtained in block 206). The description of the service impairment may identify the performance metric that was being monitored, the acceptability criterion that was violated, and/or the value of the performance metric that caused the violation. For example, if a high delay time (e.g., 300 milliseconds) indicated a service impairment in a VoIP session, the description of the service impairment may include a code that indicates an end-to-end one way delay performance metric, a code that indicates that a voice quality acceptability criterion was violated, and the delay time that the mobile node actually measured (i.e., 300 milliseconds).

Although not shown in FIG. 3, it is to be understood that the mobile node might not be able to send to service impairment report right away, for example, because of inadequate RF coverage or capacity that caused the service impairment in the first place. In such cases, the mobile node may store the service impairment report and wait until conditions improve before sending the service impairment report to the service quality management system.

When the service quality management system receives the service impairment report from the mobile node, the system may send an acknowledgement to the mobile node's user and/or initiate corrective action to address the service impairment.

4. Exemplary Mobile Node

Figure 4:
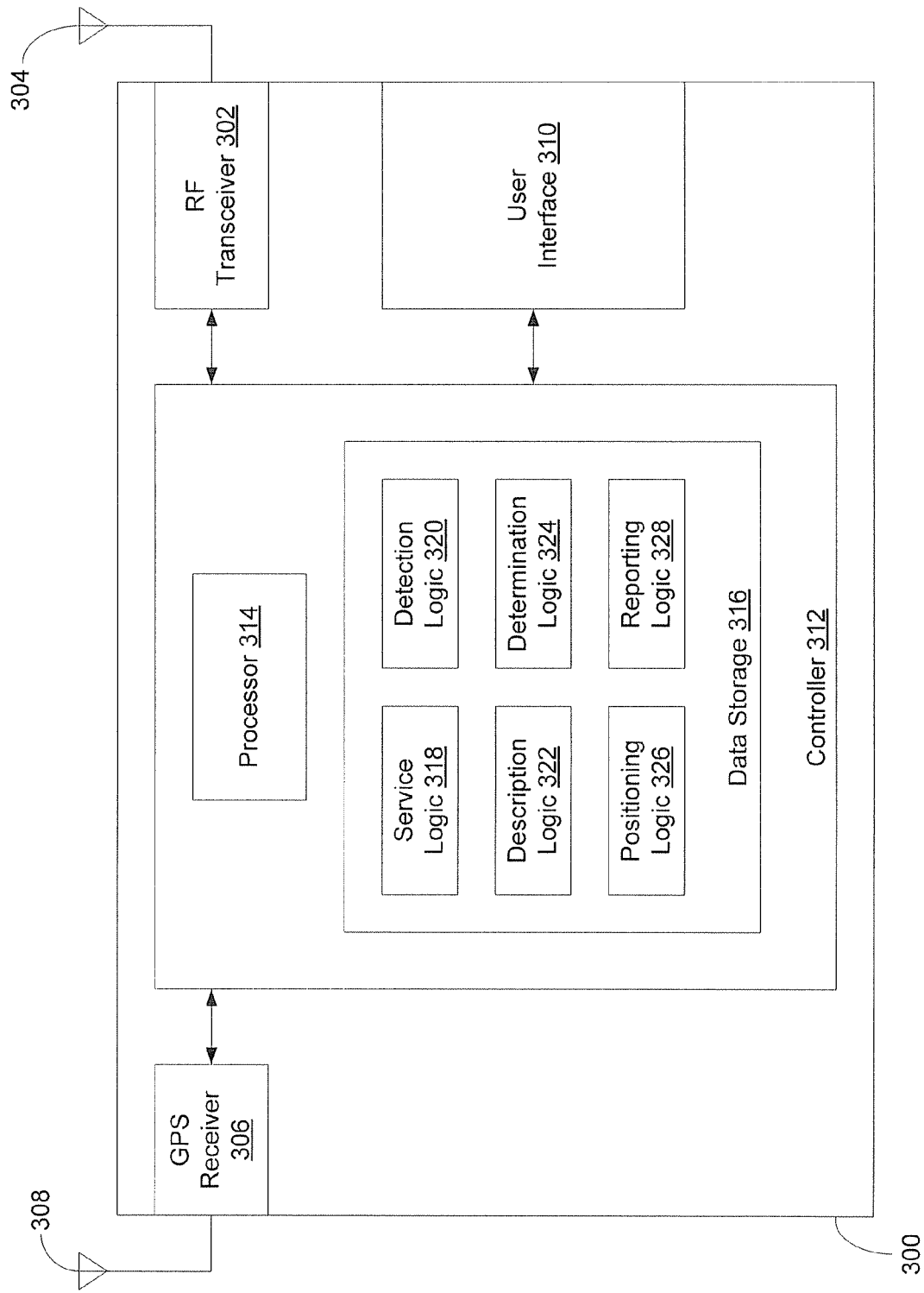
FIG. 4 is a simplified block diagram of a mobile node, in accordance with an exemplary embodiment.

A mobile node may be provisioned with functionality, such as a software client, that enables the mobile node to detect service impairments and to report such impairments to a service quality management system, for example, as described above with reference to FIGS. 2 and 3. In this regard, FIG. 4 illustrates an exemplary mobile node 300 that is provisioned with such functionality. Mobile node 300 includes an RE transceiver 302 for communicating with a wireless network via an air interface, through one or more antennas exemplified in FIG. 4 by antenna 304. Mobile node 300 may also include a GPS receiver 306 with an antenna 308 for receiving antennas from GPS satellites.

Mobile node 300 also includes a user interface 310 that allows for interaction with a user. User interface 310 may include one or more output devices, such as a display screen for displaying text, graphics, or video to the user and/or a speaker for conveying speech or other audio to the user. User interface 310 may also include one or more input devices for receiving input from the user. Such input devices may include, for example, a microphone for receiving speech or other audio input, a camera for capturing still images or video, a keypad (which may include keys for actuating control functions and keys for entering alphanumeric text), and/or a touch screen for selecting items displayed on the display screen. It is to be understood that these components of user interface 310 are exemplary only, as user interface 310 could include other types of input devices and/or output devices.

RF transceiver 302, GPS receiver 306, and user interface 310 may be controlled by a controller 312. Controller 312 could be implemented using hardware, software, and/or firmware. In an exemplary embodiment, controller 312 includes a processor 314 and data storage 316. Data storage 316 may include volatile and/or non-volatile memory. Moreover, data storage 316 stores program instructions that are executable by processor 314 for controlling the operations of mobile node 300.

The program instructions stored in data storage 316 may include service logic 318, executable by processor 314, for using one or more communication services of the wireless network. Data storage 316 may also store detection logic 320, executable by processor 314, for automatically detecting an impairment of a communication service of the wireless network. As discussed above, such impairments may include call origination failures and dropped calls. Detection logic 320 may also be executable by processor 314 for monitoring one or more performance metrics during a communication session and to compare the performance metrics to acceptability criteria in order to detect service impairments.

When a service impairment is detected, description logic 322, may be executed by processor 314 to generate a description of the service impairment. Generating a description of the service impairment could involve, for example, categorizing the service impairment by selecting a category from among a plurality of predefined service impairment categories.

Data storage 316 may also store determination logic 324 for determining a cause of a detected service impairment. Determination logic 324 may determine a cause of a service impairment such as a call origination failure or a dropped call may be determined by analyzing signal levels (such as carrier-to-noise ratios) of one or more signals from the wireless network received by RF transceiver 302.

Data storage 316 may also store positioning logic 326 that is executable by processor 314 for obtaining an estimated location of mobile node 300. The estimated location could be a GPS location fix obtained through GPS receiver 306. However, other location-determination technologies could be used.

Reporting logic 328 stored in data storage 316 may be executable for generating a service impairment report for a detected service impairment. The service impairment report may include a description of the service impairment, a time associated with the service impairment, and a location associated with the service impairment. The service impairment report could also include other information, such as a cause of the service impairment as determined using determination logic 324. Reporting logic 328 may also be executable by processor 314 for sending the sending the service impairment report to a service quality management system, e.g., using RF transceiver 302. If the attempt to send the service impairment report is unsuccessful, then reporting logic 328 may be used to store the service impairment report in data storage 316 and then wait for at least a predetermined time before trying again. That way, transmission of the report can be re-attempted periodically until conditions improve to the point that the transmission is successful.

It is to be understood that the classification of the program instructions stored in data storage 316 into service logic 318, detection logic 320, description logic 322, determination logic 324, positioning logic 326, and reporting logic 328 is exemplary only as some or all of these logical functions could be integrated together.

5. Conclusion

Exemplary embodiments of the present invention have been described above. Those skilled in the art will understand, however, that changes and modifications may be made to these embodiments without departing from the true scope and spirit of the invention, which is defined by the claims.

What is claimed is:

1. A method for monitoring service quality in a mobile node, said method comprising:
    said mobile node attempting to use a communication service of a wireless network;
    said mobile node detecting an impairment of said communication service;

said mobile node selecting a category of said impairment from among a plurality of predefined categories;

said mobile node determining a cause of said impairment; and said mobile node sending a service impairment report to a service quality management system via said wireless network, said service impairment report indicating (i) said category of said impairment, (ii) said cause of said impairment, (iii) a time associated with said impairment, and (iv) a location associated with said impairment.

2. The method of claim 1, wherein said impairment is a dropped call.

3. The method of claim 1, wherein said impairment is a blocked call.

4. The method of claim 1, wherein said communication service is a voice service.

5. The method of claim 1, wherein said communication service is a data service.

6. The method of claim 1, wherein determining a cause of said impairment comprises:

determining a signal level of a radio frequency (RF) signal transmitted by said wireless network.

7. The method of claim 1, further comprising:

in response to detecting said impairment, said mobile node obtaining an estimated location of said mobile node, wherein said service impairment report indicates said estimated location as said location associated with said impairment.

8. The method of claim 7, wherein said estimated location is obtained using a satellite-based positioning system.

9. The method of claim 1, further comprising:

said service quality management system sending a notification to a user of said mobile node, said notification acknowledging said impairment.

10. A method for monitoring service quality in a mobile node, said method comprising:

said mobile node engaging in a packet-based communication session via a wireless network;

while engaged in said packet-based communication session, said mobile node monitoring a user-perspective performance metric of said packet-based communication session;

said mobile node determining that said user-perspective performance metric indicates a service impairment; and said mobile node sending a service impairment report to a service quality management system via said wireless network, said service impairment report including (i) a description of said service impairment, (ii) a time associated with said service impairment, and (iii) a location associated with said service impairment.

11. The method of claim 10, wherein said packet-based communication session is a voice-over-packet session.

12. The method of claim 10, wherein said packet-based communication session is a data session.

13. The method of claim 10, wherein said user-perspective performance metric is a data rate.

14. The method of claim 10, wherein said mobile node determining that said user-perspective performance metric indicates a service impairment comprises:

said mobile node determining that said data rate is below a threshold data rate.

15. The method of claim 10, wherein said user-perspective performance metric is a delay time.

16. The method of claim 15, wherein said mobile node determining that said user-perspective performance metric indicates a service impairment comprises:

said mobile node determining that said delay time is above a threshold delay time.

17. A mobile node, comprising:

a radio frequency (RF) transceiver for communicating with a wireless network via an air interface a processor;

data storage;

service logic, stored in said data storage and executable by said processor, for using a communication service of said wireless network;

detection logic, stored in said data storage and executable by said processor, for detecting an impairment of said communication service;

description logic, stored in said data storage and executable by said processor, for generating a description of said impairment;

reporting logic, stored in said data storage and executable by said processor, for generating a service impairment report for transmission to a service quality management system via said wireless network, said service impairment report including (i) said description of said impairment, (ii) a time associated with said impairment, and (iii) a location associated with said impairment.

18. The mobile node of claim 17, wherein said detection logic monitors at least one user-perspective quality metric while said mobile node is engaged in said communication service.

19. The mobile node of claim 18, wherein said detection logic compares said at least one user-perspective quality metric to predefined performance criteria.

20. The mobile node of claim 17, further comprising:

determination logic, stored in said data storage and executable by said processor, for determining a cause of said impairment, wherein said service impairment report indicates said cause of said impairment.

* * * * *